United States Patent [19]

Bloss

[11] Patent Number: 4,470,850

[45] Date of Patent: Sep. 11, 1984

[54] PROCESS WITH CALCIUM SULFITE HEMIHYDRATE IN A POWDERY BYPRODUCT FROM DRY FLUE GAS DESULFURIZATION FOR THE PRODUCTION OF FLY ASH CEMENT

[75] Inventor: Wolfgang Bloss, Reichshof, Fed. Rep. of Germany

[73] Assignee: L. & C. Steinmüller GmbH, Gummersbach, Fed. Rep. of Germany

[21] Appl. No.: 311,040

[22] Filed: Oct. 13, 1981

[30] Foreign Application Priority Data

Oct. 11, 1980 [DE] Fed. Rep. of Germany ....... 3038457

[51] Int. Cl.³ .................................................. C04B 7/24
[52] U.S. Cl. .................................... 106/103; 106/109; 106/DIG. 1; 423/242
[58] Field of Search ................. 106/103, 109, DIG. 1; 423/242, 244

[56] References Cited

U.S. PATENT DOCUMENTS

| | | | |
|---|---|---|---|
| 3,785,840 | 1/1974 | Minnick et al. | 106/DIG. 1 |
| 4,134,774 | 1/1979 | Heese et al. | 106/109 X |
| 4,279,873 | 7/1981 | Felsvang et al. | 423/242 A |
| 4,297,332 | 10/1981 | Tatani et al. | 423/244 A |
| 4,331,640 | 5/1982 | Morita et al. | 423/242 A |
| 4,344,796 | 8/1982 | Minnick | 106/DIG. 1 |
| 4,354,876 | 10/1982 | Webster | 106/109 |
| 4,377,414 | 3/1983 | Buschmann et al. | 106/109 |

FOREIGN PATENT DOCUMENTS 2933121 2/1981 Fed. Rep. of Germany ...... 106/103

*Primary Examiner*—Helen M. McCarthy
*Attorney, Agent, or Firm*—Becker & Becker, Inc.

[57] ABSTRACT

A byproduct recovered in a dry flue gas desulfurization method for the production of fly ash cement. The flue gas, which results from the combustion of fossil fuel and which also carries along all or a part of the fly ash which results during the combustion, is treated in an absorber with a calcium-containing suspension (absorbing substance) in such a way that the solid materials leave the absorber as dry end product and are added entirely or partially to one or more dust removing apparatuses and are filtered off. The byproduct has a composition of 1 to 99% by weight, preferably 20 to 95% by weight, of fly ash, and 1 to 99% by weight, preferably 5 to 80% by weight, of the sum of the desulfurization products, preferably comprising calcium sulfate dihydrate and/or calcium sulfate hemihydrate and/or calcium sulfate and/or calcium sulfite hemihydrate.

6 Claims, No Drawings

PROCESS WITH CALCIUM SULFITE HEMIHYDRATE IN A POWDERY BYPRODUCT FROM DRY FLUE GAS DESULFURIZATION FOR THE PRODUCTION OF FLY ASH CEMENT

The present invention relates to the use of a byproduct recovered in a dry flue gas desulfurization method for the production of fly ash cement. The flue gas, which results from the combustion of fossil fuels which also carries along all or a part of the fly ash which results during the combustion, is treated in an absorber with a calcium-containing suspension (absorbing substance) in such a way that the solid materials leave the absorber as dry end product and are added entirely or partially to one or more dust removing apparatuses and are filtered off. The byproduct has a composition of 1 to 99% by weight, preferably 20 to 95% by weight, of fly ash, and 1 to 99% by weight, preferably 5 to 80% by weight, of the sum of the desulfurization products, preferably comprising calcium sulfate dihydrate and/or calcium sulfate hemihydrate and/or calcium sulfate and/or calcium sulfite hemihydrate.

Gypsum is added during the production of cement as a solidification retarder. This added material was previously ground in with the cement clinker in the form of natural gypsum or natural anhydrous gypsum.

Cements having a base of cement clinker and fly ash have already been standardized in some countries, where they are used as hydraulic binder or cement (fly ash cement) in the construction industry.

In this connection, depending upon the standard, the proportion of fly ash in the cement may or may not be limited.

During the treatment of flue gases which result from the combustion of fossil fuels, it is necessary, as a result of the tightening up of clean air regulations, to take measures which reduce the sulfur content of such flue gases. The desulfurization of the flue gases can be a dry flue gas desulfurization. Depending upon the way that the dry flue gas desulfurization is carried out, a mixture of fly ash, calcium-containing reaction products of the desulfurization, and the remainder of the calcium-containing absorbent is recovered. In this connection, the proportion of calcium sulfate-containing reaction products, and the proportion of calcium sulfite-containing reaction products, can be controlled by the manner in which the desulfurization is carried out. Up to now, this byproduct could only be dumped in a way which was harmful to the environment.

Tests have proven that the calcium sulfite hemihydrate can replace the calcium sulfate dihydrate, -hemihydrate, and -anhydrous forms in their function as solidification regulator, with the formation of calcium aluminate monosulfite hydrate $3CaO \cdot Al_2O_3 \cdot CaSO_3 \cdot 8H_2O$ replacing the formation of "Ettringit" $3CaO \cdot Al_2O_3 \cdot 3CaSO_4 \cdot 30\text{-}32H_2O$, or calcium aluminate monosulfate hydrate $3CaO \cdot Al_2O_3 \cdot CaSO_4 \cdot 12H_2O$.

It is therefore an object of the present invention to use a byproduct not only as a solidification regulator but also as an additional material during the production of fly ash cement in place of the previously used natural gypsum or natural anhydrous gypsum as the solidification retarder and in place of the previously used fly ash as the additional material to the cement clinker.

The present invention is characterized primarily by the use of a byproduct from the dry flue gas desulfurization, which byproduct comprises a mixture of fly ash and the actual reaction products of the dry flue gas desulfurization, and has a composition of 1 to 99%, preferably 20 to 95%, fly ash, and 1 to 99%, preferably 5 to 80%, of the sum of the desulfurization products, namely calcium sulfate dihydrate and/or calcium sulfate hemihydrate and/or anhydrous calcium sulfate and/or calcium sulfite hemihydrate.

According to specific features of the present invention, the byproduct coming from the absorber can be utilized. Alternatively, the byproduct coming from one or more dust removing apparatuses can be utilized. It is also possible to use a mixture of byproducts from the absorber and the dust removing apparatus. This last mentioned mixture can be any variation of parts by weight of the byproducts from the absorber and from the dust removing apparatus.

The advantages obtained with the present invention consist in that a byproduct formed during the dry flue gas desulfurization can be economically used during the production of fly ash cement. Since the composition of the byproduct can be controlled by the manner in which the dry flue gas desulfurization is carried out in such a way that the byproduct can contain the necessary amount not only of the solidification retarder but also of the additional cement material, the cost per apparatus for the fly ash cement production can be reduced, and the production of fly ash cement can be more economically designed. Also, by the use of such a product as the solidification regulator and simultaneously as additional material during the production of fly ash cement, the harmful dumping thereof into the environment is no longer necessary. In particular, environmentally harmful salts remain in the byproduct. In addition, the use of this automatic byproduct reduces not only the exhaustion of naturally occurring gypsum deposits, but also reduces the reduction of lime-containing raw materials for the production of unprocessed cement powder.

The present invention is, of course, in no way restricted to the specific disclosure of the specification, but also encompasses any modifications within the scope of the appended claims.

The following is one specific example of the present invention.

EXAMPLE

An industrially produced Portland cement clinker (Table 1) from a production plant was respectively ground in a bell or pebble mill to a specific surface of 3500 cm$^2$ per gram (according to Blaine) with:

(a) natural gypsum, and
(b) the byproduct from a dry flue gas desulfurization plant (Table 2).

The Portland cement sample produced with (a) had a natural gypsum content of 3% by weight, calculated as $SO_3$.

Fly ash cement was produced with (b), and contained 15% by weight byproduct.

Tests were carried out on the thus produced cements pursuant to German Industrial Norm (DIN) 1164 of 1978, sections 6 and 7. The results of these tests established conformity with the standard (Table 3).

TABLE 1

| Analysis of the Portland cement clinker: | |
|---|---|
| Constituent | % by weight |
| $SiO_2$ | 21.78 |
| $Al_2O_3$ | 5.87 |

TABLE 1-continued

| Analysis of the Portland cement clinker: | |
|---|---|
| Constituent | % by weight |
| $Fe_2O_3$ | 1.86 |
| CaO | 67.29 |
| MgO | 1.02 |
| $K_2O$ | 0.89 |
| $SO_3$ | 0.65 |
| $3CaO \cdot SiO_2$ | 62 |
| $2CaO \cdot SiO_2$ | 16 |
| $3CaO \cdot Al_2O_3$ | 12 |
| $2CaO(Al_2O_3, Fe_2O_3)$ | 6 |

TABLE 2

| Partial analysis of the byproduct from the dry flue gas desulfurization: | |
|---|---|
| Constituent | % by weight |
| $SiO_2$ | 40.76 |
| $Fe_2O_3$ | 14.14 |
| $Al_2O_3$ | 17.14 |
| CaO | 16.44 |
| MgO | 1.14 |
| $Na_2O$ | 0.74 |
| $K_2O$ | 0.68 |
| $SO_3$ —sulfate | 0.69 |
| $SO_2$ —sulfite | 10.04 |
| chloride ions | 0.064 |
| C | 0.89 |
| $CaSO_4 \cdot 2H_2O$ | 1.48 } calculated |
| $CaSO_3 \cdot \frac{1}{2}H_2O$ | 20.30 |

TABLE 3

| Test of the cements pursuant to DIN 1164: | | |
|---|---|---|
| Characteristic tested: | Results: | |
| Constancy of volume | (a) Portland cement requirement met | (b) fly ash cement requirement met |
| Dynamic modulus of elasticity after 28 days ($N/mm^2$) | 3500 | 33500 |
| Bending strength after 28 days ($N/mm^2$) | 7.8 | 7.4 |
| compressive strength after 28 days ($N/mm^2$) | 53 | 51 |

For purposes of conversion from metric values (based on Metric Conversion Handbook by Marvin H. Green; Chemical Publishing Co., 155 W. 19th St., N.Y., N.Y. 10011)

1 newton per square millimeter = 1,000,000 pascals
1 psi = 1 pound-force per square inch or = 6894.757 pascals Thus the test of cements per Table 3 can be stated also as follows:

| Characteristic tested: | Results: | |
|---|---|---|
| Constancy of Volume | (a) Portland cement requirement met | (b) fly ash cement requirement met |
| Dynamic modulus of elasticity after 28 days (psi) | $5.07 \times 10^6$ | $4.85 \times 10^6$ |
| Bending strength after 28 days (psi) | 7.8 | 7.4 |
| Compressive strength after 28 days (psi) | 53 | 51 |

What I claim is:

1. In a process of production of fly ash cement by grinding portland cement clinker containing $CaO \cdot Al_2O_3$ with fly ash and gypsum as solidification regulator, the improvement of using in place of fly ash and gypsum a powdery byproduct, which is recovered in anhydrous flue gas desulfurization process, said flue gas resulting from the combustion of fossil fuel and carrying along at least a part of the fly ash which also results during said combustion, said flue gas being treated in an absorber with a calcium-containing suspension (absorbing substance) in such a way that solid material leaves said absorber as dry end product which is at least partially added to at least one dust removing apparatus and is filtered off, said byproduct having a composition of 20 to 95% by weight fly ash, and 5 to 80% by weight of calcium-containing reaction products of the desulfurization process in which byproduct $SO_2^-$ exceeds $SO_3^-$ and the essential reaction product which functions as solidification regulator is calcium sulfite hemihydrate.

2. A process according to claim 1, in which said byproduct additionally includes one or more of the group of calcium sulfate dihydrate, calcium sulfate hemihydrate, and anhydrous calcium sulfate, in said desulfurization products.

3. A process according to claim 1, which utilizes only the byproduct coming from said absorber.

4. A process according to claim 1, which utilizes only the byproduct coming from said at least one dust removing apparatus.

5. A process according to claim 1, which utilizes a mixture of the byproducts from said absorber and said at least one dust removing apparatus.

6. A process according to claim 5, in which said mixture comprises any desired combination of weight percentage of said byproducts from said absorber and said at least one dust removing apparatus.

* * * * *